US008013230B2

(12) United States Patent
Eggink

(10) Patent No.: US 8,013,230 B2
(45) Date of Patent: Sep. 6, 2011

(54) METHOD FOR MUSIC STRUCTURE ANALYSIS

(75) Inventor: Jana Eggink, Stuttgart (DE)

(73) Assignee: Sony Corporation, Tokyo (JP)

(*) Notice: Subject to any disclaimer, the term of this patent is extended or adjusted under 35 U.S.C. 154(b) by 282 days.

(21) Appl. No.: 12/255,221

(22) Filed: Oct. 21, 2008

(65) Prior Publication Data
US 2009/0151544 A1 Jun. 18, 2009

(30) Foreign Application Priority Data
Dec. 17, 2007 (EP) .................................. 07024421

(51) Int. Cl.
A63H 5/00 (2006.01)

(52) U.S. Cl. .......................................................... 84/609

(58) Field of Classification Search .................. 84/606, 84/616
See application file for complete search history.

(56) References Cited

U.S. PATENT DOCUMENTS

| 6,225,546 | B1 | 5/2001 | Kraft et al. | |
| 6,542,869 | B1 | 4/2003 | Foote | |
| 2005/0241465 | A1* | 11/2005 | Goto | 84/616 |
| 2006/0120536 | A1 | 6/2006 | Kemp | |
| 2009/0287323 | A1* | 11/2009 | Kobayashi | 700/94 |

FOREIGN PATENT DOCUMENTS

| DE | 10 2004 036 154 B3 | 12/2005 |
| EP | 1 667 106 A1 | 6/2006 |

OTHER PUBLICATIONS

U.S. Appl. No. 12/205,201, filed Sep. 5, 2008, Kemp, et al.

Masataka Goto, "A Chrous Section Detection Method for Musical Audio Signals and Its Application to a Music Listening Station", IEEE Transactions on Audio, Speech, and Language Processing, vol. 14, No. 5, Sep. 2006, pp. 1783-1794.

Beth Logan, et al., "Music Summarization Using Key Phrases", Acoustic, Speech, and Signal Processing, 2000. IEEE International Conference on Jun. 5-9, 2000, XP010504831, vol. 2, Jun. 5, 2000, pp. 749-752.

Lie Lu, et al., "Content-based audio classification and segmentation by using support vector machines", Multimedia Systems, XP003006384, vol. 8, 2003, pp. 482-491.

Mathew Cooper, et al., "Automatic Music Summarization via Similarity Analysis", Proceedings of ISMIR 2002, XP002473760, pp. 81-85.

Mark A. Bartsch, et al., "To Catch a Chorus: Using Chroma-Based Representations for Audio Thumbnailing", Applications of Signal Processing to Audio and Acoustics, IEEE Workshop, Oct. 21-24, 2001, XP010566863, pp. 15-18.

Kris West, et al., "Finding an Optimal Segmentation for Audio Genre Classification", Proceedings of ISMIR 2005, XP 002473761, pp. 680-685.

* cited by examiner

Primary Examiner — Jianchun Qin
(74) Attorney, Agent, or Firm — Oblon, Spivak, McClelland, Maier & Neustadt, L.L.P.

(57) ABSTRACT

Methods for music structure analysis of a piece of music includes determining predetermined features for a plurality of sections of the piece of music. The sections are longer than a shortest time span corresponding to a meaningful part of the piece of music. At least two sections are compared based on the predetermined features, and a chorus of the piece of music is determined based on a comparison result of the comparing. First and second groups of the sections are determined, such that a similarity among sections of the first and second groups lie within respective first and second ranges. The first range has a higher level than the second range.

21 Claims, 9 Drawing Sheets

METHOD FOR MUSIC STRUCTURE ANALYSIS

An embodiment of the invention relates to a method for music structure analysis of a piece of music. A further embodiment of the invention relates to a device for playback of a chorus of a piece of music. Another embodiment of the invention relates to a system for downloading a user selected part of a song.

BACKGROUND

Today, large music data bases exist comprising several thousands or even more songs. Further, handheld devices exist that enable a user to store a large number of songs. In order to quickly find a song, the user may want to only listen to a part of a song. The part should, however, not be selected arbitrary. Instead the user may only want to listen to a certain structural element of the song, e.g. to the chorus.

Thus, a music structure analysis is necessary.

It is an object of the invention to provide a method for music structure analysis. Further, it is an object of the invention to provide respective devices.

These objects are solved by the independent claims.

Further details of embodiments of the invention will become apparent from a consideration of the drawings and ensuing description.

DETAILED DESCRIPTION OF THE INVENTION

In the following, embodiments of the invention are described. It is important to note that all described embodiments in the following may be combined in any way, i.e. there is no limitation that certain described embodiments may not be combined with others.

Figure 1:
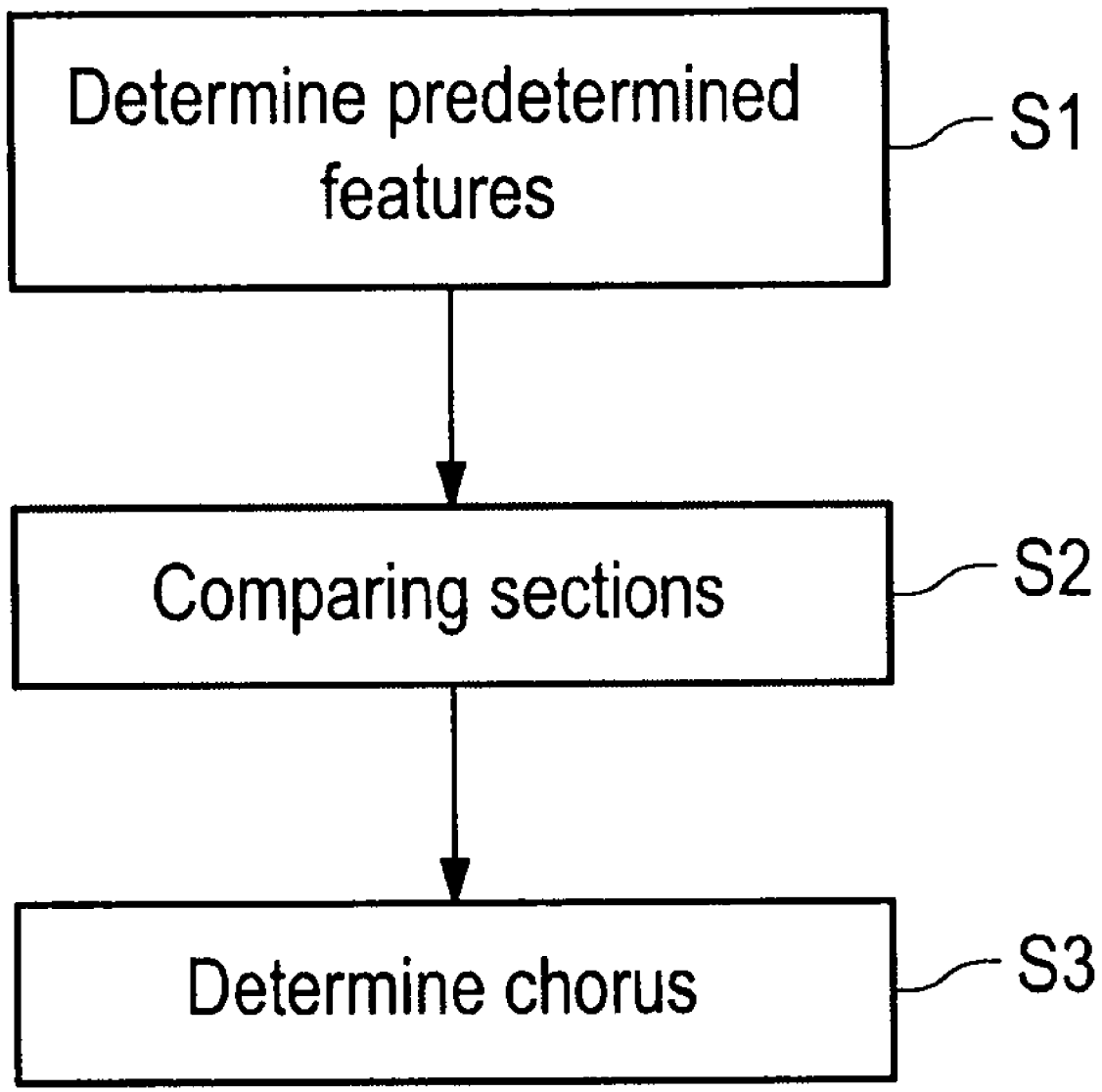
FIG. 1 shows a flowchart of an embodiment of the invention.

In FIG. 1, in step S1, predetermined features for a plurality of sections of a piece of music are determined. The piece of music may e.g. be a song. The sections may be longer than a shortest time span corresponding to a meaningful part of said piece of music. Such a shortest time span may be 1 second. Thus, the sections may be longer than 1 second. In a further embodiment, the sections may be longer than 5 seconds, and/or shorter than 40 seconds. For example, the length of the sections may be set to 15 seconds. It may also be possible to set the length of the sections to essentially correspond to an average length of a chorus of a piece of music. The average length of the chorus may be determined automatically from a data base. Alternatively, the length may be set according to a predetermined music theory.

In step S2, at least two sections are compared based on the predetermined features. The comparison may e.g. be done based on computing a similarity measure for said sections.

In step S3, the chorus of the piece of music is determined based on a comparison result of the step of comparing. For example the two most similar sections of the plurality of sections may be determined based on the comparison result, and the chorus corresponds at least partly to one of said two most similar sections.

The predetermined features are not necessarily based on Mel Frequency Cepstral Coefficients (MFCC) or chroma. Using such kind of features (features that are not based on MFCC or chroma) allows having rather long sections to be compared while keeping the computing time at a low level. Using the features described in this specification allows having section lengths of around 15 seconds while keeping the computational time low. The computational time may be lower by a factor of 10 to 50 than in prior art.

In general, the features may be based on temporal positions of local extreme values, local minima and/or local maxima. The local minima/maxima values may comprise local energy minima/maxima values of an energy of the piece of music in a predetermined frequency range. Additionally or alternatively the local minima/maxima values may comprise local zero crossings minima/maxima. The term "local zero crossings minima/maxima" refers to regions of the audio signal where a low number (minima) of zero crossings occur or where a high number (maxima) of zero crossings occur.

In a further embodiment, it would also be possible to use extreme values of MFCCs.

Part of the features may only depend on a property (characteristic) of an audio signal corresponding to the piece of music within a first frequency range, i.e. frequency band. At least one further part of the features may only depend on a further property of the audio signal within at least one further frequency range, said further frequency range having another range than the first frequency range.

Further, the property and/or the further property may correspond to the energy of the audio signal within the first and further frequency range, respectively. Thus, for each moment in time the energy in different frequency ranges may be determined and features may be determined depending on the energy in the frequency ranges. The effect of using a plurality of frequency ranges results in an increase of information density, and hence allows a higher recognition rate. Suitable frequency ranges are e.g. 500 to 750 Hz, 1000 to 1500 Hz, 1000 to 2000 Hz, 1000 to 1250 Hz, 750 to 1000 Hz and 2000 to 4000 Hz.

The features may depend on a relative position (with respect to the beginning and end of a section) in time of local maxima and/or minima of the energy. Thus, when comparing two sections, the position of local maxima within a certain frequency range in one section may be compared with the position of local maxima of another section. If the local maxima are in the vicinity of each other relative to the beginning of the two sections to be compared, then a similarity measure may be increased.

The energy might be determined for each time frame of a predefined length. As for the zero crossings (see below) the length of each time frame may be in the range of 10 ms. In order to calculate the minimum/maximum energy features, a predetermined number of maximum/minimum energy time frames within one section may be determined. The minimum/ maximum energy time frames have a lower/higher energy than the remaining time frames of the respective section. When comparing two sections, the relative positions of the maximum/minimum energy time frames of the two sections may be compared. For example, if the predetermined number is equal to 20, than the 20 time frames of a respective section having higher energy than any of the remaining time frames of this section are determined. These 20 time frames are then the maximum/minimum energy time frames. If each section has a length of e.g. 15 seconds there will be 1,500 frames, i.e. each section may have first to $1,500^{th}$ frames. Then it is determined if the distribution of the positions of the maximum/minimum energy time frames of the two sections to be compared is similar, i.e. if maximum/minimum energy time frames of the two sections are relatively in the vicinity of each other. If e.g. the $10^{th}$ frame of a first section is a maximum/minimum energy time frame and also the $10^{th}$ frame of a second section is a maximum/minimum energy time frame than a similarity measure for the two sections may be increased.

Further, a first predetermined number of local maxima and/or minima may be determined for each of the sections. The number of maxima/minima in each section may e.g. between 15 to 25. Thus, e.g. the positions of the 15 highest local maxima of each section may be determined.

Further, at least a part of the features may depend on the number of zero crossings of the audio signal. Therefore, for each time frame of predefined length the number of zero crossings may be determined. The length of each time frame may be in the range of 10 milliseconds. Also, a second predetermined number of maximum/minimum zero crossing time frames within one section may be determined. The maximum/minimum zero crossing time frames have a higher/lower number of zero crossing than the remaining time frames of the respective section. When comparing two sections, the relative positions of the maximum/minimum zero crossing time frames of the two sections may be compared. For example, if the second predetermined number is equal to 20, than the 20 time frames of a respective section having more zero crossings than any of the remaining time frames of this section are determined. These 20 time frames are then maximum/minimum zero crossing time frames. If each section has a length of e.g. 15 seconds there will be 1,500 frames, i.e. each section may have first to $1,500^{th}$ frames. Now it is determined if the distribution of the positions of the maximum/minimum zero crossing time frames of the two sections to be compared is similar, i.e. if maximum/minimum zero crossing time frames of the two sections are relatively in the vicinity of each other. If e.g. the $10^{th}$ frame of a first section is a maximum/minimum zero crossing time frame and also the $10^{th}$ frame of a second section is a maximum/minimum zero crossing time frame than a similarity measure for the two sections may be increased.

As can be easily understood from the above, in essence the local minima/maxima of the energy within a certain frequency band and the zero crossing rates are treated similar.

In a further embodiment, before selecting the maxima/minima, the energy/zero crossing values may be smoothed. Therefore, a short term average may be computed by taking the mean feature values of ± a few time frames, e.g. ±2 frames. Further, a long term average may be computed, e.g. ±50 frames. Then, the quotient short term average/long term average might be computed. The division by the long term average may help to counteract changes in the loudness of a song. If, for example, a song continually increases in volume, all energy maxima would be at the end of the selected section. By normalizing with the long term average, the extreme values (local minima/maxima) may be more evenly distributed.

In a further embodiment, it may be required that two extreme values have to be a certain number of frames apart from each other, e.g. 20 frames. This may also help to distribute the position of extreme values more evenly. Generally, these measures may achieve greater robustness in case of local distortions or corruptions of the audio file of the piece of music.

Additionally and/or alternatively, two sections may be compared based on features as explained in detail in EP 1 667 106.

Further, a first and second group of sections may be determined, wherein the similarity among sections of said first group lies within a first range and the similarity among sections of said second group lies within a second range, said first range having a higher level than said second range. Thus, a music structure analysis may be performed wherein e.g. intro, verse sections, chorus sections, and outro of a song are determined. In other words, in this embodiment of the invention, not only the chorus may be identified, but also all verses as a group with segments of e.g. a medium similarity, and intro, outro and bridges as a non-repeated group with low similarity values. When implementing this feature e.g. in an online music store, the user may be enabled to choose the segment (chorus or verse) he wants to listen to before buying a song.

Further, a mood of the piece of music may be determined based on the chorus and/or the at least one section. The mood of the piece of music may be determined based only on the chorus. The recognition rate of the mood may be very high because the chorus is often more characteristic regarding the mood of the song than other parts. The reason is that the chorus may be a more homogeneous part of the piece of music which makes automatic mood detection easier.

Further, the length of the chorus may correspond to a region of the piece of music, where a large number of local maxima/minima coincide or are in the vicinity of each other.

Additionally or alternatively the chorus may be determined based on an overall energy contour of the audio signal.

Figure 2:
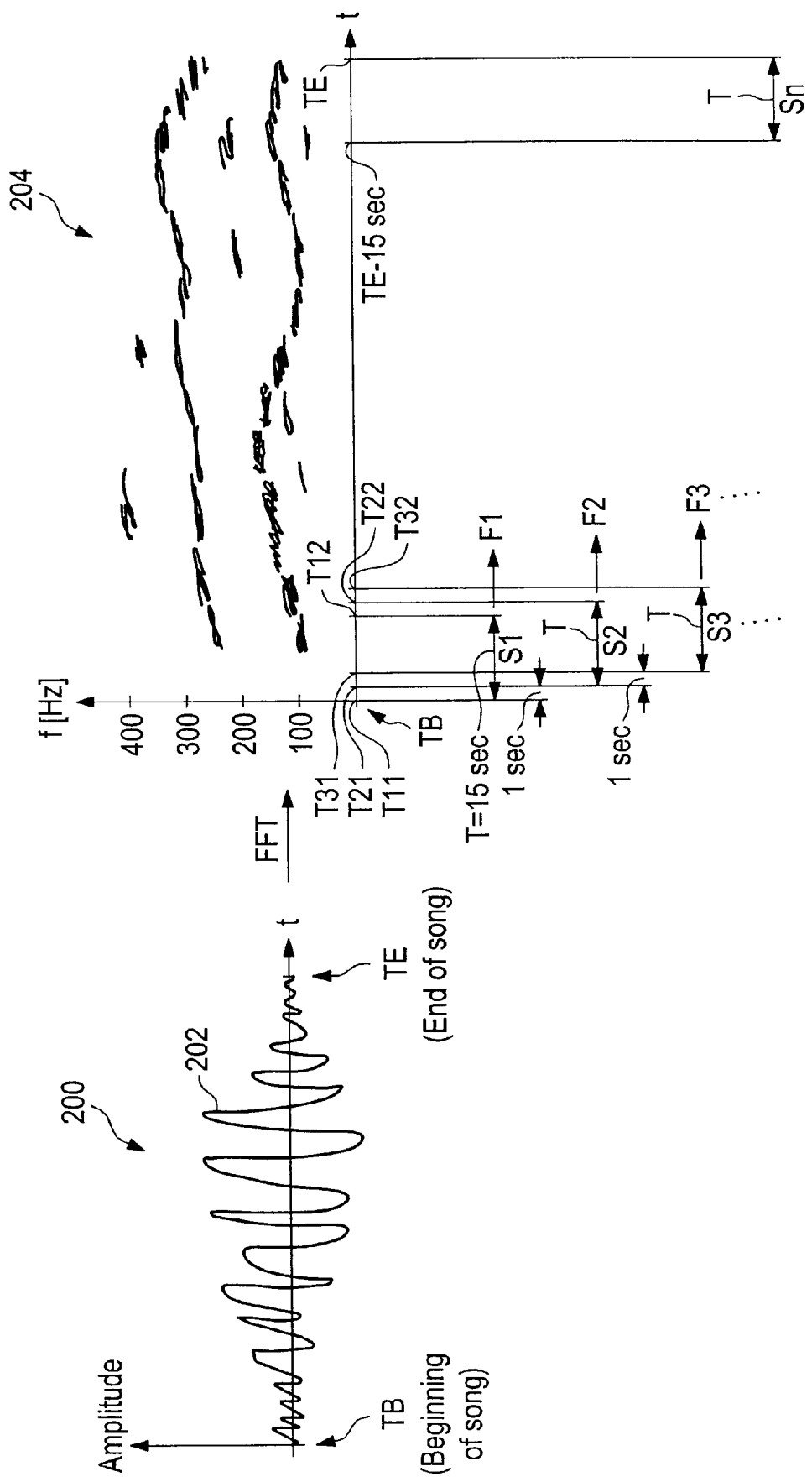
FIG. 2 shows diagrams for illustrating how sections of a piece of music are determined.

On the left hand side of FIG. 2, a first diagram 200 is depicted. First diagram 200 shows an audio signal 202 of a song. The song starts at time TB and ends at time TE.

On the right hand side of FIG. 2, a second diagram 204 is shown. The second diagram 204 shows a spectrogram obtained by performing multiple FFTs (Fast Fourier Transformation) on successive and potentially overlapping short frames/windows. In other words, FFTs may also be computed based on frames of 10 to 30 ms.

As said above, the music structure analysis according to an embodiment of the invention is determined by comparing sections derived from the song. On the right hand side of FIG. 2, it can be seen how sections S1, S2, S3 are determined. In the example, the length of each section is T=15 seconds. A section is determined for each second. Thus, for example the first section S1 lasts from T11=TB=0 seconds to T12=15 seconds. Further, the second section S2 starts at T21=1 second, and ends at T22=16 seconds. The third to n-th sections S3 to Sn are determined accordingly. The length of a section may also be varied. For example, the method for music structure analysis may also work with sections having a length of one second. Also, sections of 5 seconds length up to 40 seconds length or more are possible. Good results may also be obtained if the length of a section is in the range of an average length of a chorus of a piece of music, e.g. in the range of 15 seconds.

For each section, a feature vector F1 to F3 is determined as explained below.

Figure 3:
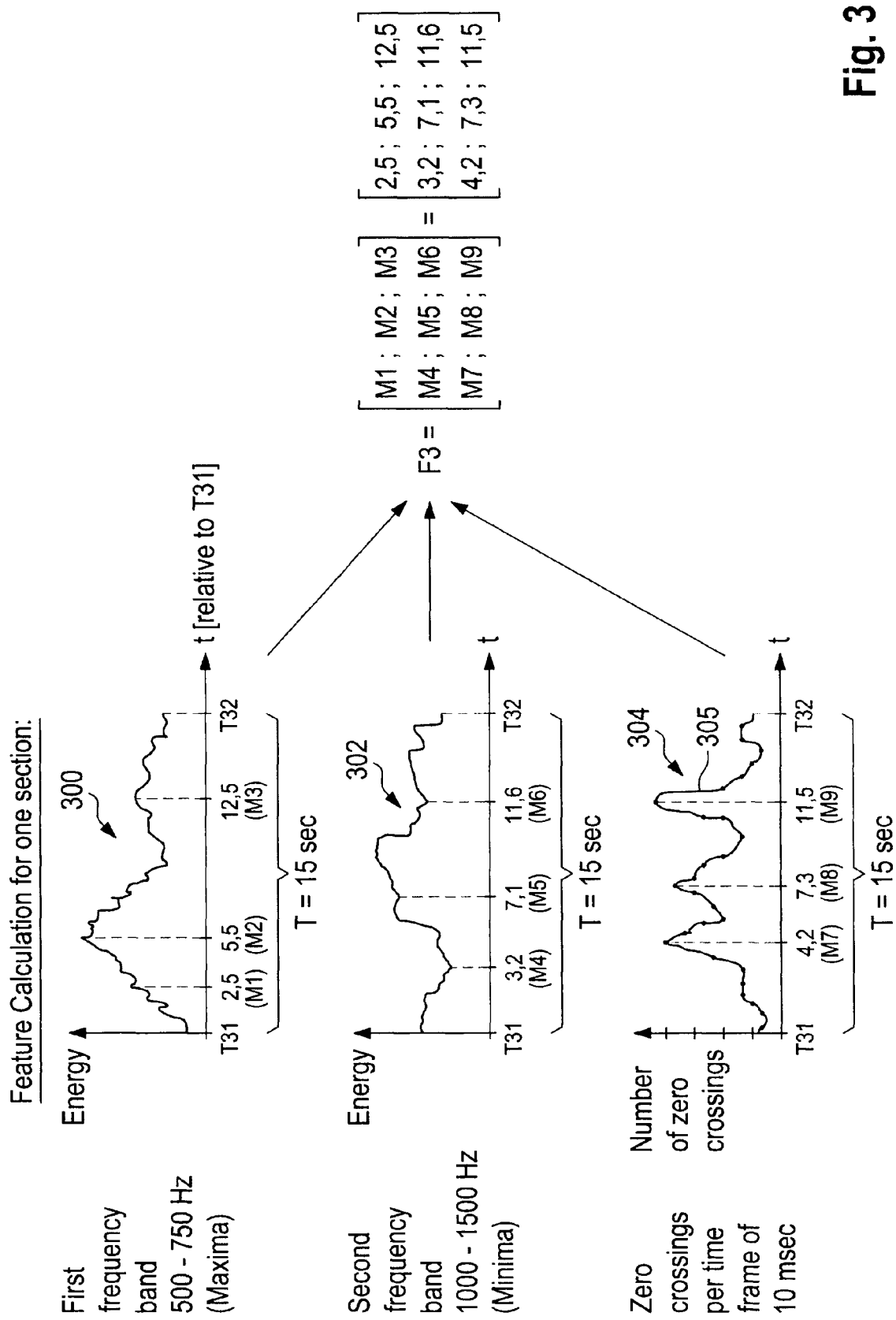
FIG. 3 shows diagrams for illustrating how features of sections are determined.

FIG. 3 shows how a feature vector of a section is determined. In the example of FIG. 3, the features F3 of the third section S3 of FIG. 2 are determined as an example.

In order to determine the features of a section, a plurality of frequency bands may be determined. In the example of FIG. 3, there are two frequency bands depicted, i.e. a first frequency band ranging from 500 to 750 Hz, and a second frequency band ranging from 1000 to 1500 Hz. It should be noted that FIG. 3 only serves to explain the principle of determining features in frequency bands, and in reality there may be more frequency bands. For example, there may be frequency bands from 500 to 750 Hz, 1000 to 1500 Hz, 1000 to 2000 Hz, 1000 to 1250 Hz, 750 to 1000 Hz, and 2000 to 4000 Hz.

In order to determine a feature vector F3 for the third section lasting from T31 to T32, the energies of time frames of 10 milliseconds in each frequency band are determined. The energies of the time frames of the third section within the first frequency band ranging from 500 to 750 Hz are depicted in diagram 300. Further, the energies of the section S3 in the second frequency band ranging from 1000 to 1500 Hz is depicted in diagram 302.

In each frequency band, local energy maxima or minima are determined and the feature vector F3 is determined depending on the relative position of the local maxima/minima.

In the example of FIG. 3, in diagram 300, a first local maxima M1 occurs at t=2.5 seconds calculated from the beginning T31 of the third section S3. Further, a second and third local maxima occurs at t=5.5 seconds and t=12.5 seconds, respectively. These values are part of the third feature vector F3, as seen on the right hand side of FIG. 3.

Similarly, in diagram 302, the position of local minima is determined. In diagram 302, local minima M4, M5 and M6 occur at t=3.2 seconds, t=7.1 seconds, and t=11.6 seconds, respectively (in each case these time values are determined relative to the beginning of a third section T31). The position at which minima occur are again part of the feature vector F3.

Further features of each section are based on time frames of the sections having a large/small number of zero crossings. In order to determine features based on the number of zero crossings, a section is divided into time frames of equal length (same as for computing the energy values). For example, the length of each time frame may be 10 milliseconds. In the example of FIG. 3, the third section S3 may have a length of 15 seconds. Thus, there will be 15,00 time frames for third section S3. For each time frame, the number of zero crossings of the audio signal is then determined. In the diagram 304, each dot 305 corresponds to the respective number of zero crossings of the audio signal within the corresponding time frame. In order to determine the features, a predetermined number of maximum/minimum zero crossing time frames within each section is determined, wherein the maximum/minimum zero crossing time frames have a higher/lower number of zero crossings than the remaining time frames of the respective section. In the example of diagram 304, the predetermined number is three and, therefore, three maximum zero crossing time frames are determined for the third section S3. The relative position of the maximum zero crossing time frames determine the respective values of the feature vector F3. In the example of diagram 304, the maximum zero crossing time frames are at t=4.2 seconds, t=7.3 seconds, and t=11.5 seconds (in each case these values are again relative with respect to the beginning of the section).

Thus, the feature vector $$F3 = \begin{matrix} 2,5 & 5,5 & 12,5 \\ 3,2 & 7,1 & 11,6 \\ 4,2 & 7,3 & 11,5 \end{matrix}$$

In order to compare two sections, the feature vectors of the two sections are compared. Therefore, a similarity measure may be determined based on the feature vectors. The similarity measure essentially compares the relative positions of the local maxima/minima of the energy contour within corresponding frequency bands and/or the relative positions of maximum/minimum zero crossing time frames.

Figure 4:
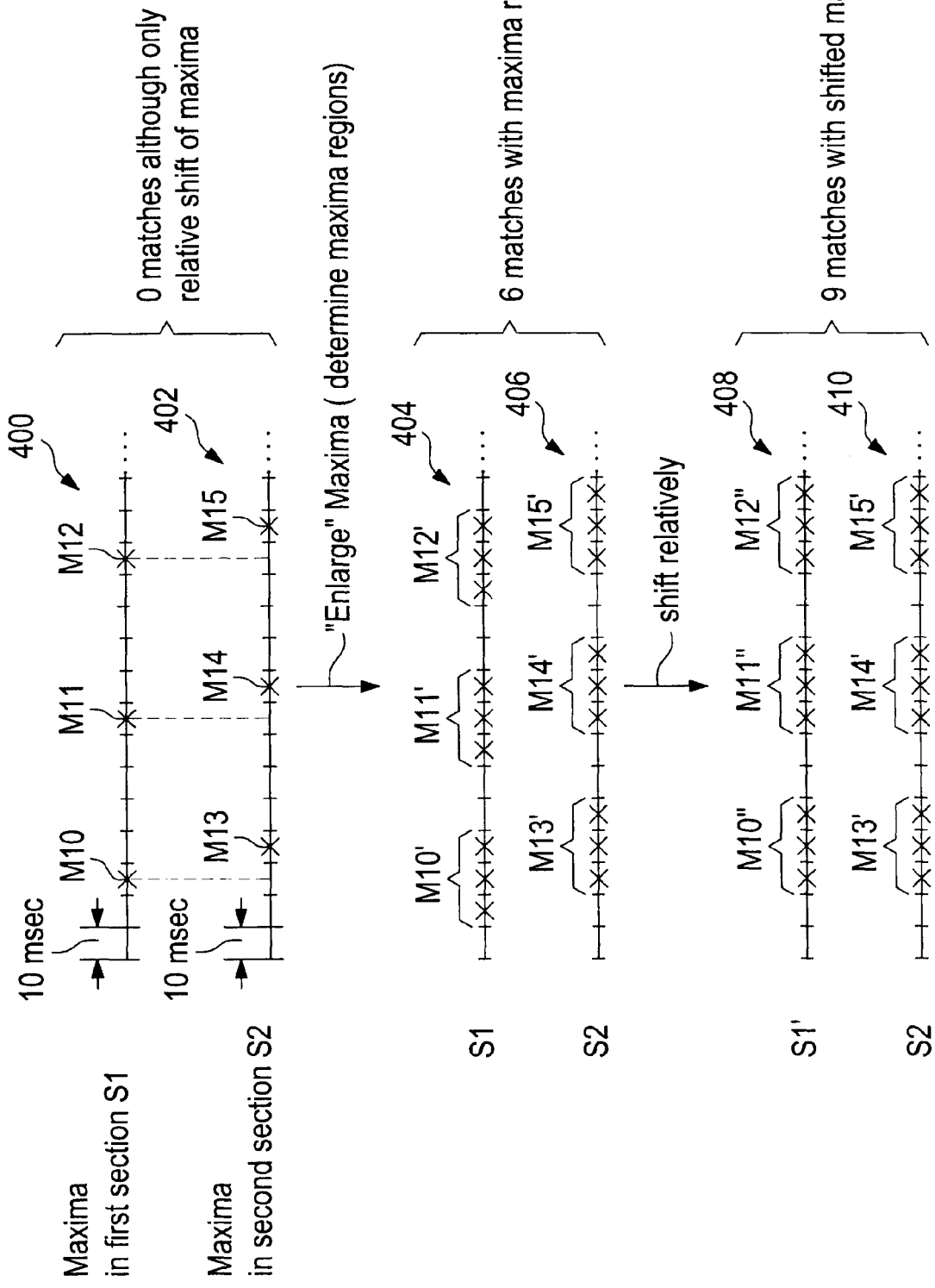
FIG. 4 shows diagrams for illustrating how sections are compared.

In the example of FIG. 4, it is shown how positions of local maxima in the first frequency band of a first and second section S1 and S2 are compared.

Each time frame having a local maximum is marked. In diagram 400 of FIG. 4 maxima M10, M11 and M12 occur in the respective time frames of section S1. Further, local maxima M13, M14, and M15 are shown in diagram 402 and correspond to time frames having a respective local maximum in the second section S2.

Alternatively to splitting a section into time frames of a predetermined length and afterwards computing the FFT, it is also possible to use a band pass filtering in the time domain instead of the FFT. In this case, in order to compare the position and/or distribution of local maxima/minima within a frequency band, each section could be separated into time frames of predetermined length after the band pass filtering.

In order to determine the degree of similarity of the local maxima in the first frequency band, the number of matching time frames of the two sections S1 and S2 is determined. Thus, the first time frame of first section S1 and the first time frame of the second section S2 are compared to each other by checking if a local maximum occurred in the respective first time frame. If a local maximum occurred in both first time frames of sections S1 and S2, then a matching score would be increased. In the same manner, the remaining time frames of the two sections are compared.

As seen, when comparing sections S1 and S2 based on diagrams 400 and 402, there will be zero matches since no time frame exists that has a local maximum in both diagrams. When comparing diagrams 400 and 402, one can see, however, that the local maxima of the first diagram 400 and second diagram 402 corresponding to the first and second sections S1, and S2, respectively, are only shifted with respect to each other.

Thus, it can be assumed that although zero matches occurred, the two sections may be similar.

In order to take into account this relative shift of local maxima, the maxima are "enlarged" as shown in diagrams 404 and 406 corresponding to sections S1, and S2, respectively. Thus, the number of local maxima of each section is increased by adding a local maxima in the preceding and subsequent time frame of a time frame having a local maximum. Then, again the number of matches is determined as explained above. As can be seen, when comparing diagrams 404, and 406, there are now six matches. The "enlarging" (adding of maxima left and right to the true maximum) may help to counteract the shifting of individual maxima, caused e.g. by small variations in the music when repeating a chorus.

In order to further take into account the shifting, it is also possible to additionally shift the different sections relatively to each other. This shown at the bottom of FIG. 4, where diagram 408 corresponds to shifted diagram 404 and diagram 410 corresponds to diagram 406. As seen, the number of matches can be further increased by this shifting, and there are now nine matches. The relative shifting of the sections to each other may help to overcome an overall time shift of all maxima.

In the example of FIG. 4, a comparison of local maxima in the first frequency band has been explained. The principles of FIG. 4 are likewise applied when comparing the position of maximum/minimum zero crossing time frames.

Based on the number of matches, which are determined as explained at hand of FIG. 4, the position of the chorus may be determined. Therefore, for each section respective matching scores may be determined. Then, the two sections having the highest matching score are determined. One of the two sections having the highest matching score is assumed to be the chorus, e.g. the first of the two sections may be determined to be the chorus.

Figure 5:
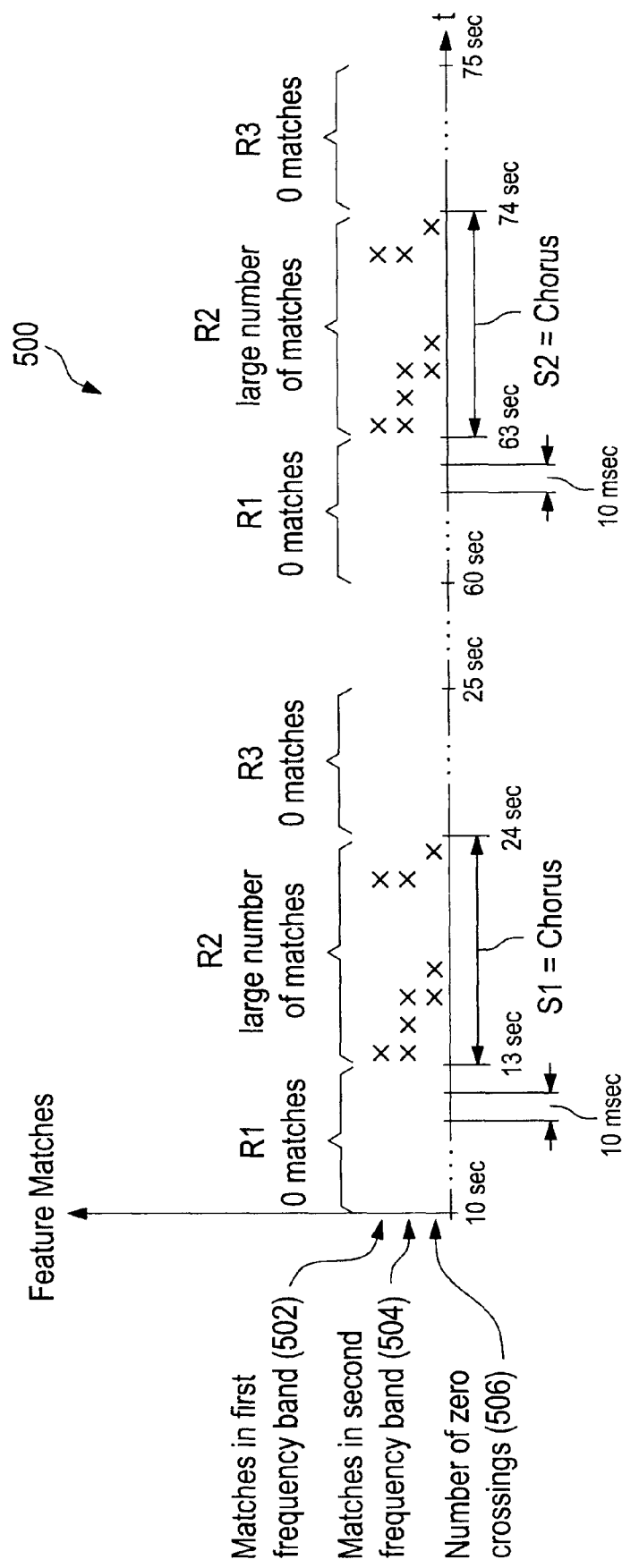
FIG. 5 shows diagrams for illustrating how a chorus is determined.

It is also possible to evaluate the distribution of matches as shown in FIG. 5. On the left hand side of diagram 500 in FIG. 5, the distribution of matches in a first frequency band 502, second frequency band 504, and the distribution of matches of the number of zero crossings 506 is shown. As seen, in a first region R1 there are zero matches, in a second region R2, a large number of matches occurs, and in a third region R3, zero matches occur. The second region R2 corresponding to section S1 lasts from 13 seconds to 24 seconds and has the same distribution (possibly with enlarged regions as explained at hand of diagrams 404 and 406 of FIG. 4), as that of section S2 lasting from 63 to 74 seconds). Since the number of matches of the first and second section S1 and S2 is the highest of all sections, it is assumed that sections S1 and S2 correspond to the chorus of the song.

If the chorus of a song is longer than the length of the section, it is possible to evaluate the number of matches of a subsequent section. As seen in diagram 600 of FIG. 6, there is a large number of matches in the depicted section lasting from 10 seconds to 25 seconds. In the subsequent section lasting from 11 seconds to 26 seconds, there is a large number of matches at the end of the section. The same applies to the subsequent section depicted in diagram 604, which section lasts from 12 seconds to 27 seconds. However, the subsequent section lasting from 13 seconds to 28 seconds depicted in diagram 606, has no further matches. Thus, the length of the chorus is determined to be 17 seconds.

Figure 7:
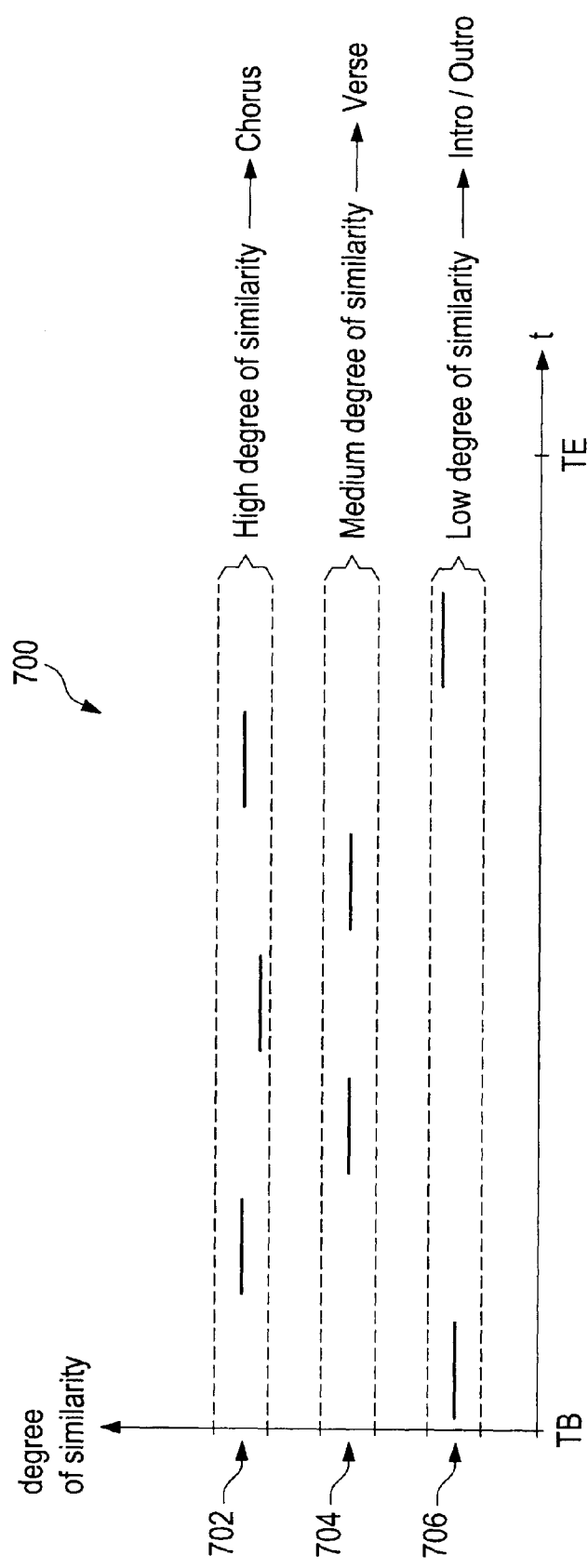
FIG. 7 shows a diagram for illustrating how a structure of a piece of music is determined.

FIG. 7 shows how the degree of similarity of the different sections may be used to determine the structure of a piece of music comprising e.g. an intro, one or several verses, one or several chorus parts, and an outro.

In order to determine the structure, different ranges 702, 704, 706 of a degree of similarity may be defined. Sections having a high degree of similarity may correspond to the chorus. Sections having a medium degree of similarity may correspond to a verse of the song. Further, sections having a low degree of similarity may correspond to an intro/outro or other parts of the song.

Figure 8:
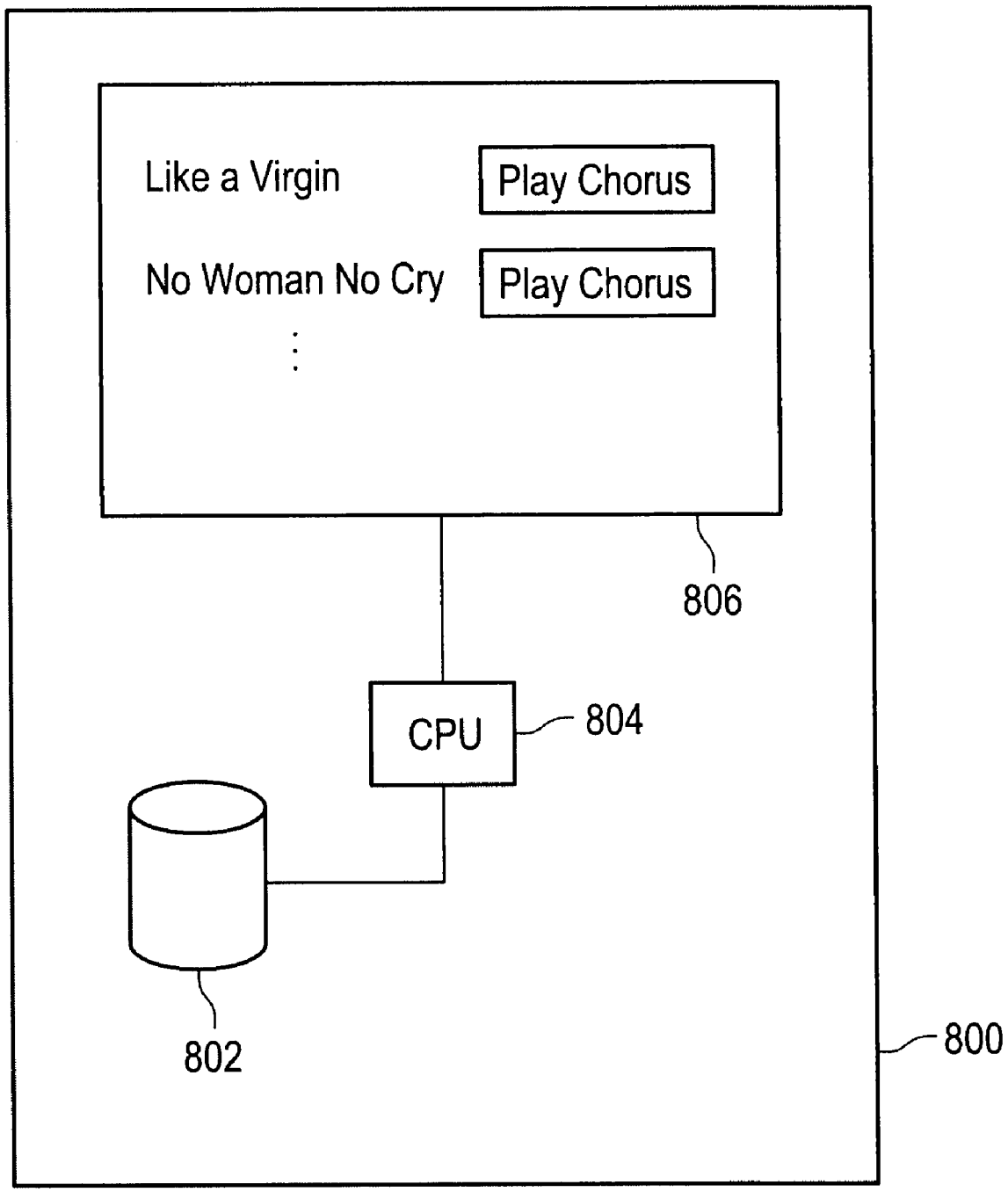
FIG. 8 shows a handheld device according to a further embodiment of the invention.

The above described method may be applied within a variety of different devices. One example of such a device is handheld device 800 depicted in FIG. 8 comprising a data storage 802 configured to store a plurality of pieces of music. Handheld device 800 further comprises a data processor 804 configured to determine the features for the sections and to compare at least two sections based on the features. The chorus of the piece of music may be determined based on the comparison result (number of matches, see above).

Handheld device 800 may also comprise a display 806 having a graphical user interface. On the display 806, a list of songs may be displayed, and the graphical user interface may provide a button "play chorus". If the user presses this button, then the chorus of the respective song may be played.

In a further embodiment, an online music store may be realized, wherein for each song, the user may select a desired part of a song, e.g. an intro, verse, chorus or the like.

Figure 9:
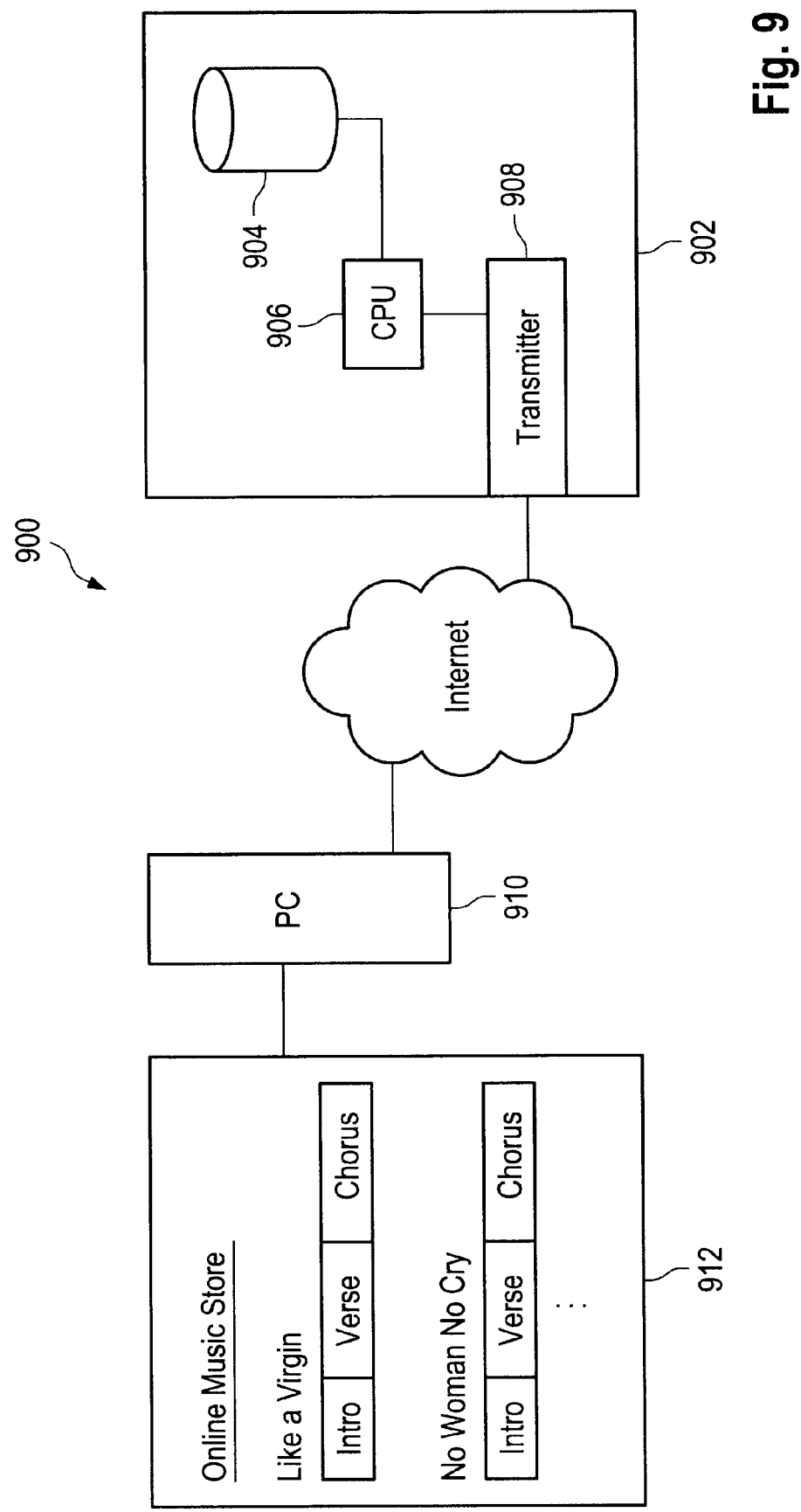
FIG. 9 shows a system for realizing an online music store according to a further embodiment of the invention.

A respective system 900 is shown in FIG. 9. System 900 comprises a server 902 comprising a data storage 904, data processor 906, and transmitter 908. Data processor 906 is configured to determine the above features and compare sections of a respective song with each other based on the features. Thus, the chorus of the song may be determined.

The chorus and/or the complete song may be transmitted by transmitter 908 via the internet to a user's personal computer 910. Personal computer 910 may be connected to a display 912. On display 912, a list of songs available as download may be displayed. Further, a graphical user interface may be provided. The graphical user interface may allow the user to select a specific part of a song, e.g. the chorus which has been detected by data processor 906 of server 902.

Thus, the system 900 enables the user to directly select a certain part of a song. This may increase the commercial success of the online music store because the user may recognize a song more easily based on the chorus than on e.g. the beginning of a song. Thus, if the user is sure that he likes a certain song, which he may evaluate from the chorus, he will be more tempted to buy the song via the online music store.

The following illustrations may help a person skilled in the art to get a better understanding of embodiments of the invention:

There may be provided a system that generates a representative summary of a pop song given the audio data. The most representative part may be defined as a repeated chorus section. The described algorithm compares the temporal order of local extreme values in different frequency bands and finds matching regions. A repeated chorus segment will have a higher matching score with another chorus segment than e.g. two parts of the verse, where the lyrics will differ from one strophe to the next.

As has been described, sections having a length between e.g. 1 to 40 seconds are compared. As a result, regions of high similarity are obtained, so that finding diagonals in a self-similarity matrix is not needed. The sections having features with the highest matching score are assumed to be the chorus. The first section of two sections to be compared is chosen to be the representative summary (chorus). A further structural analysis may be possible, e.g. finding all chorus parts, meaning segments with a high similarity to the first pair, and other segments which show high similarity to each other.

Figure 6:
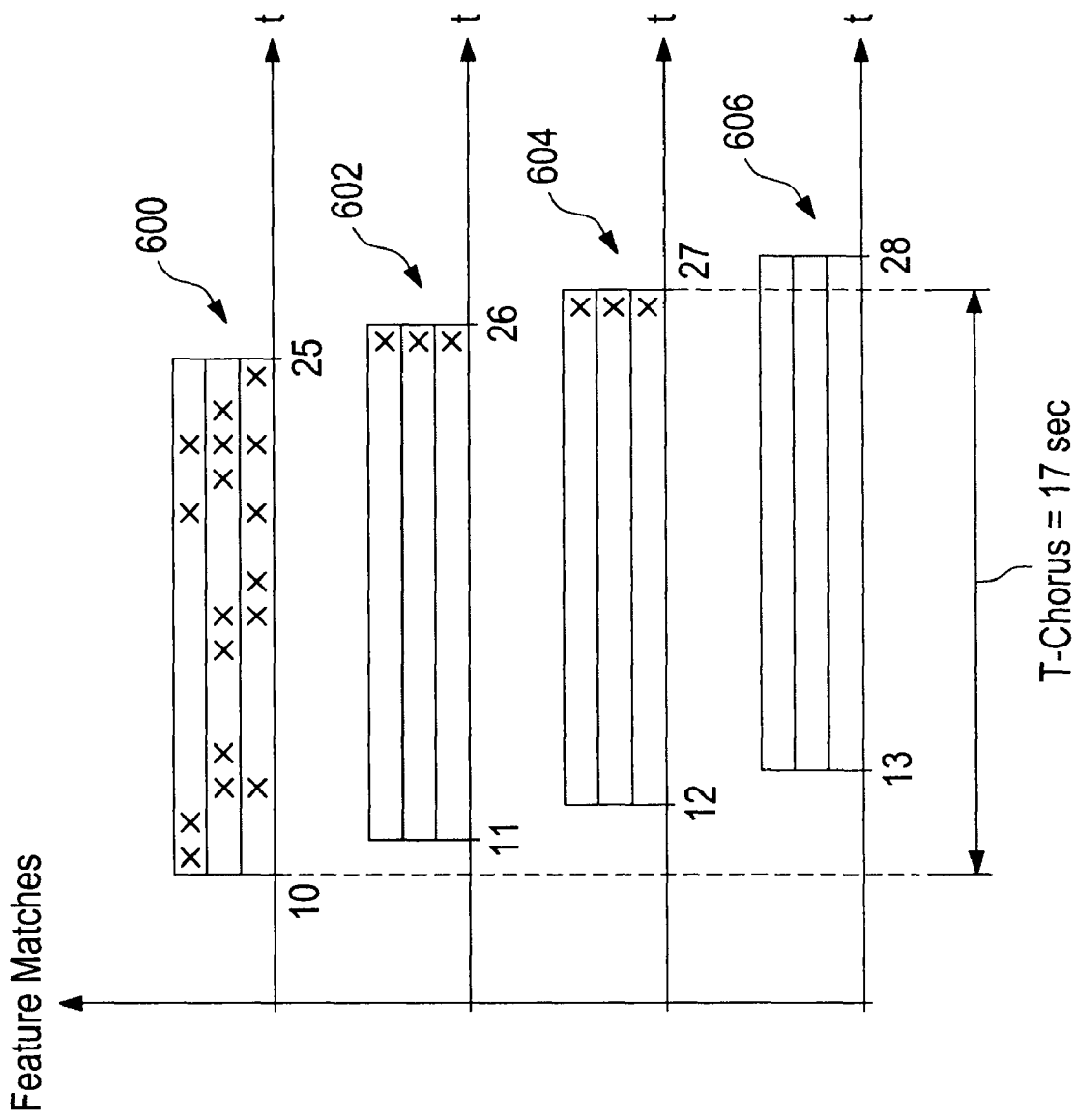
FIG. 6 shows a further diagram for illustrating how a chorus is determined.

In order to determine the exact length of the chorus, it may be possible to find regions of arbitrary length, where many peaks/valleys (maxima/minima) coincide (see e.g. FIGS. 5 and 6). Alternatively or additionally, the overall energy contour may be used, as sudden changes often mark different sections as e.g. the beginning of the chorus, or by using other additional frame based spectral similarity measures.

As already said above, additionally and/or alternatively, two sections may be compared based on features as explained in detail in EP 1 667 106.

Accordingly, it is possible to only use a subset of the features described above, e.g. a subset which may be computed in time domain without FFT, i.e. zero crossing rate and energy in the entire frequency range. This subset of features may be used to minimize computational costs if both minima and maxima of energy and zero crossing are used, resulting in four different features. The results when using only the subset of features are slightly below those using the energy in different frequency bands as explained above, however it is about three times faster.

Thus, a variety of time-domain features from a piece of music and/or section may be used as time stamps (i.e. where the time domain feature has occurred), i.e. as a 'signature' describing a respective section. It may be possible to use not the absolute location but the relative distance of the time domain features as signatures. Furthermore, time domain features of several types may be combined, for example local maxima of the energy contour, local minima of the energy contour, maxima and minima of the zero crossing rate, into a signature (feature vector), where the time differences between features within one type and also between types are all used to identify a given piece of music and/or section.

Essentially all the analysis may be carried out on based on frames. A frame is a time slice of the original music piece with a length of e.g. 16 milliseconds. Frames are spaced 10 milliseconds apart from each other.

The following time domain features on suitably down-sampled and stereo-to-mono converted audio files may be used (typical parameters for this are a sampling rate of 22050 Hz):

EPEAK—the difference of the mean value of the short-time energy as computed over a long time period (+−50 frames) and the mean value of the short time energy as computed over a short time period (+−2 frames)

EVALLEY—EPEAK multiplied by (−1)

ZCRPEAK—the difference of the mean value of the frame zerocrossing rage as computed over a long time period (+−50 frames) and the mean value of the frame zerocrossing rate computed over a short time period (+−2 frames)

ZCRVALLEY—ZCRPEAK multiplied by (−1)

The signature is formed by the frame indices (corresponding to times) of the peaks of the respective time domain features.

When two signatures (i.e. feature vectors of two sections) are compared to check whether they are similar, since they can be time-shifted versions of each other, all possible differences between peaks in each of the time domain features have to be taken into account as potential shifts. Shifts exceeding a predefined threshold can be discarded, which greatly speeds up the comparison.

The invention claimed is:

1. A method for music structure analysis of a piece of music, comprising:
    determining predetermined features for a plurality of sections of said piece of music, wherein said sections are longer than a shortest time span corresponding to a meaningful part of said piece of music;
    comparing, by a processor, at least two sections based on said predetermined features;
    determining a chorus of said piece of music based on a comparison result of said step of comparing; and
    determining first and second groups of said sections, wherein
    a similarity among sections of said first group lies within a first range and a similarity among sections of said second group lies within a second range, said first range having a higher level than said second range.

2. The method according to claim 1, wherein said sections are longer than five seconds and/or shorter than 40 seconds.

3. The method according to claim 1 or 2, wherein a length of said sections essentially corresponds to an average length of a chorus of a piece of music.

4. The method according to claim 1, wherein said features are based on temporal positions of local minima/maxima.

5. The method according to claim 4, wherein said local minima/maxima comprise local energy minima/maxima of an energy of said piece of music in a predetermined frequency range and/or local zero crossings minima/maxima.

6. The method according to claim 1, wherein at least a part of said features depends on a property of an audio signal corresponding to said piece of music within a first frequency range.

7. The method according to claim 6, wherein at least one further part of said features depends on a further property of said audio signal within at least one further frequency range, said further frequency range having another range than said first frequency range.

8. The method according to claim 7, wherein said property and/or said further property corresponds to the energy of said audio signal within said first and further frequency range, respectively.

9. The method according to claim 8, wherein said features depend on a position of local maxima and/or minima of said energy.

10. The method according to claim 9, wherein a first predetermined number of local maxima and/or minima is determined for each of said sections.

11. The method according to claim 1, wherein at least a part of said features depends on a number of zero crossings of said audio signal.

12. The method according to claim 11, wherein for each time frame of a predefined length said number of zero crossings is determined.

13. The method according to claim 12, wherein a second predetermined number of maximum/minimum zero crossing time frames within one section is determined, said maximum/minimum zero crossing time frames having a higher/lower number of zero crossings than the remaining time frames of the respective section.

14. The method according to claim 13, wherein when comparing two sections, the relative position of said maximum/minimum zero crossing time frames of the two sections are compared.

15. The method according to claim 1, wherein sections of said first group correspond to the chorus and at least one of said sections of said second group corresponds to a verse of said piece of music.

16. The method according to claim 1, wherein a mood of said piece of music is determined based on said chorus and/or said at least one section.

17. The method according to claim 1, wherein the length of said chorus corresponds to a region of said piece of music where a large number of local maxima/minima coincide or are in the vicinity of each other.

18. The method according to claim 1, wherein said chorus is determined based on an overall energy contour of said audio signal.

19. The method according to claim 1, wherein two most similar sections of said plurality of sections are determined based on said comparison result, and said chorus corresponds at least partly to one of said two most similar sections.

20. A device for music structure analysis of a piece of music, comprising:
    means for determining predetermined features for a plurality of sections of said piece of music, wherein said sections are longer than one second;
    means for comparing at least two sections based on said predetermined features;
    means for determining a chorus of said piece of music based on a comparison result of said step of comparing; and means for determining first and second groups of said sections, wherein a similarity among sections of said first group lies within a first range and a similarity among sections of said second group lies within a second range, said first range having a higher level than said second range.

21. A computer readable medium storing computer program instructions that cause a computer to execute a method of music structure analysis of a piece of music, said method comprising:

determining predetermined features for a plurality of sections of said piece of music, wherein said sections are longer than one second;

comparing at least two sections based on said predetermined features;

determining a chorus of said piece of music based on a comparison result of said step of comparing; and determining first and second groups of said sections, wherein a similarity among sections of said first group lies within a first range and a similarity among sections of said second group lies within a second range, said first range having a higher level than said second range.

* * * * *